(12) United States Patent
Quijano et al.

(10) Patent No.: US 10,514,729 B2
(45) Date of Patent: Dec. 24, 2019

(54) SUPPORT MEMBER FOR A COMPUTING DEVICE

(71) Applicant: Hewlett-Packard Development Company, L.P., Houston, TX (US)

(72) Inventors: David Quijano, Fort Collins, CO (US); Owen Richard, Fort Collins, CO (US); Jonathan D. Bassett, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/520,250

(22) PCT Filed: Nov. 12, 2014

(86) PCT No.: PCT/US2014/065202
§ 371 (c)(1),
(2) Date: Apr. 19, 2017

(87) PCT Pub. No.: WO2016/076851
PCT Pub. Date: May 19, 2016

(65) Prior Publication Data
US 2017/0315585 A1  Nov. 2, 2017

(51) Int. Cl.
*G06F 1/16*   (2006.01)

(52) U.S. Cl.
CPC .......... *G06F 1/1681* (2013.01); *G06F 1/1613* (2013.01); *G06F 1/1615* (2013.01); *G06F 1/1616* (2013.01); *G06F 1/1626* (2013.01); *G06F 1/1656* (2013.01)

(58) Field of Classification Search
CPC .... G06F 1/1681; G06F 1/1613; G06F 1/1615; G06F 1/1616
See application file for complete search history.

(56) References Cited

U.S. PATENT DOCUMENTS

| 6,351,373 B1 | 2/2002 | Le et al. |
| 6,819,551 B2 | 11/2004 | Chen |
| 7,601,067 B2 | 10/2009 | Anderson |
| 8,144,452 B2 | 3/2012 | Huang et al. |

(Continued)

FOREIGN PATENT DOCUMENTS

| CN | 103197735 A | 7/2013 |
| TW | M399586 U1 | 3/2011 |
| WO | WO-2014062971 A1 | 4/2014 |

OTHER PUBLICATIONS

Novena, 2014, pp. 1-24, Crowd Supply, Available at: <https://www.crowdsupply.com/kosagi/novena-open-lapton>.

*Primary Examiner* — Nidhi Thaker
(74) *Attorney, Agent, or Firm* — Fabian VanCott

(57) ABSTRACT

Examples disclosed herein provide a computing device. One example computing device includes an enclosure and a support member rotatably connected to the enclosure at a first end of the support member, via a shaft disposed within the enclosure along a perimeter of the enclosure. The computing device includes a panel connected at a second end of the support member opposite the first end. As an example, the panel is to enclose the enclosure when the support member is to rotate towards the enclosure. When the support member is to rotate via the shaft, the support member is to wrap around the perimeter of the enclosure.

20 Claims, 5 Drawing Sheets

(56) References Cited

U.S. PATENT DOCUMENTS

| | | | |
|---|---|---|---|
| 9,092,200 B2* | 7/2015 | Richard | F16M 11/10 |
| 10,194,564 B2* | 1/2019 | Dunn | H05K 7/20145 |
| 2005/0057910 A1 | 3/2005 | Schnurr | |
| 2006/0091274 A1* | 5/2006 | Asamarai | F16M 11/10 |
| | | | 248/292.11 |
| 2006/0288532 A1* | 12/2006 | Kim, II | E05D 7/1077 |
| | | | 16/267 |
| 2011/0058326 A1* | 3/2011 | Idems | G09F 9/30 |
| | | | 361/679.21 |
| 2011/0116231 A1* | 5/2011 | Dunn | H04N 5/64 |
| | | | 361/695 |
| 2011/0133619 A1* | 6/2011 | Ma | G06F 1/1681 |
| | | | 312/326 |
| 2011/0176268 A1 | 7/2011 | Kuang et al. | |
| 2012/0212896 A1 | 8/2012 | Schulz | |
| 2013/0163200 A1* | 6/2013 | Takahashi | H05K 5/0213 |
| | | | 361/692 |
| 2013/0170119 A1 | 7/2013 | Lai et al. | |
| 2013/0176672 A1 | 7/2013 | Richard et al. | |
| 2014/0084770 A1* | 3/2014 | Tsai | G06F 1/1679 |
| | | | 312/326 |
| 2014/0293534 A1* | 10/2014 | Siddiqui | E05D 7/00 |
| | | | 361/679.55 |
| 2015/0252602 A1* | 9/2015 | Nielsen | E05D 11/06 |
| | | | 16/275 |
| 2018/0224900 A1* | 8/2018 | Senatori | G06F 1/1681 |

* cited by examiner

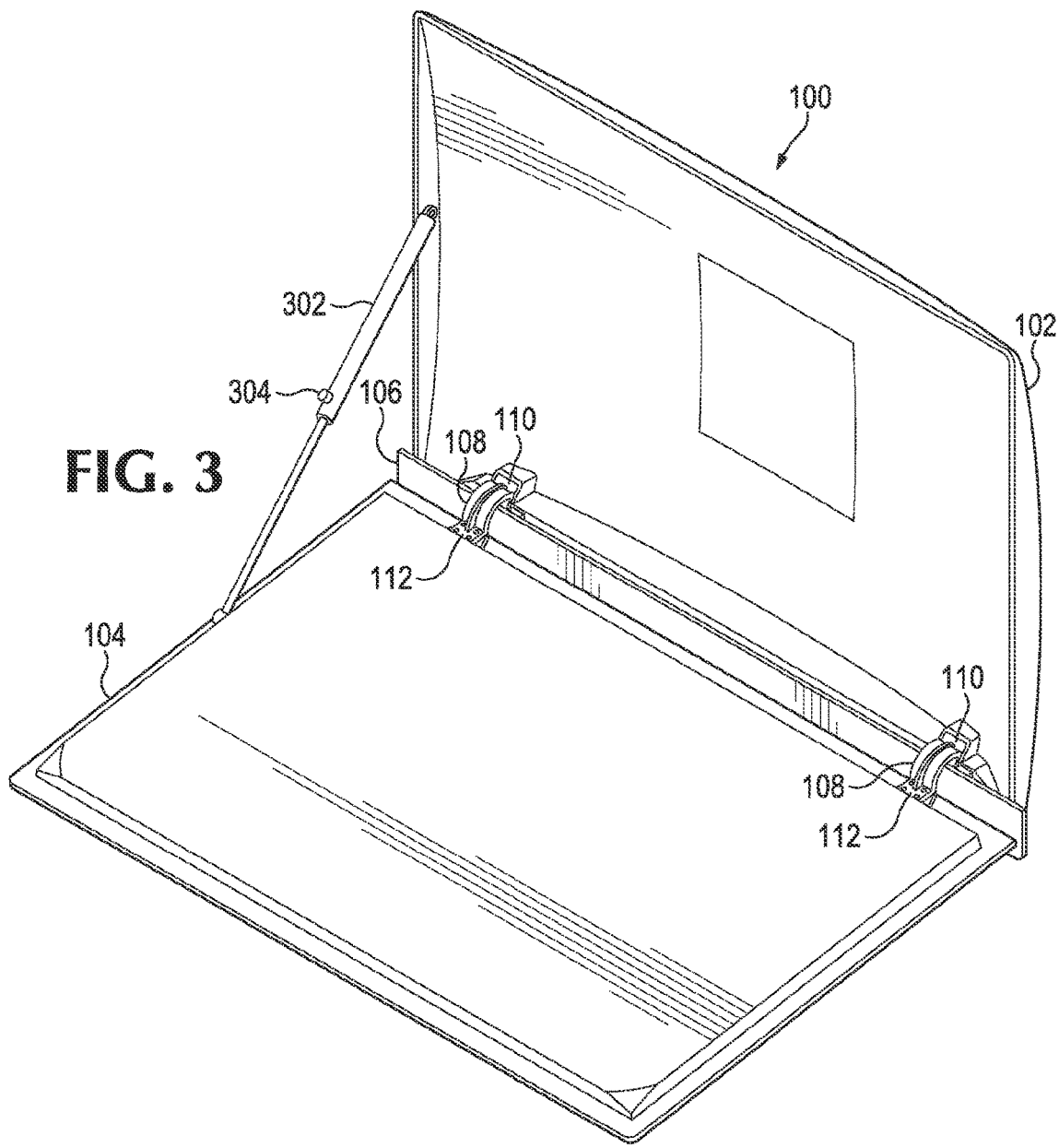

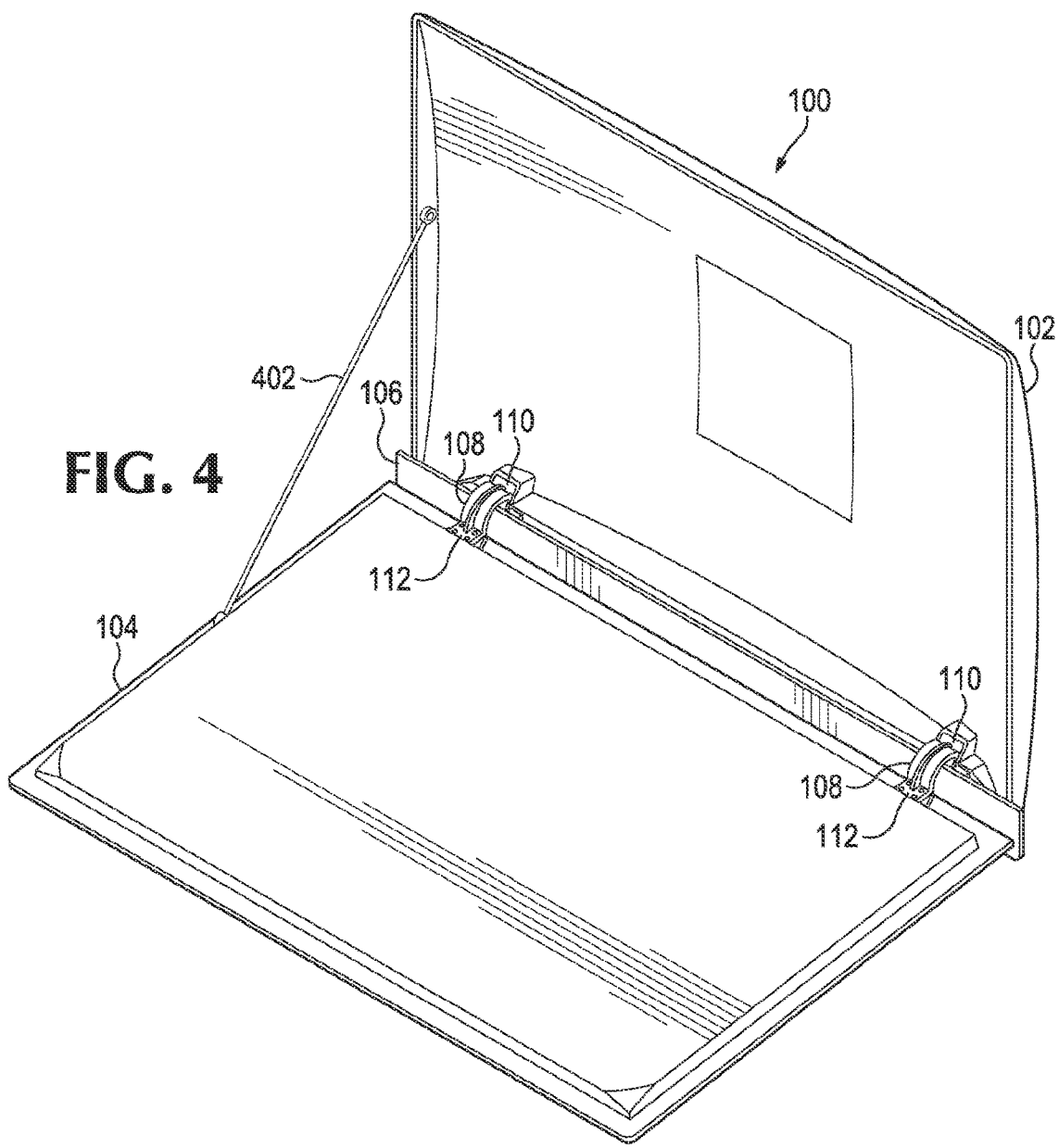

SUPPORT MEMBER FOR A COMPUTING DEVICE

CROSS-REFERENCE TO RELATED APPLICATION

This application is a U.S. National Stage Application of and claims priority to International Patent Application No. PCT/US2014/065202, filed on Nov. 12, 2014, and entitled "SUPPORT MEMBER FOR A COMPUTING DEVICE."

BACKGROUND

The emergence and popularity of computing has made computing devices a staple in today's marketplace. An example of such devices include all-in-one (AIO) computers, which integrate internal components of the computer into the same case as the display, compared to a standard desktop configuration generally including a separate display monitor and computer system case. Consumers may desire for computing devices, such as AIO computers, to have a compact design. As the internal components of AIO computers are located in the same case as the display, internal access into the case may be required, for example, for service procedures and upgrades. As AIO computers continue to become more compact, the ability for users to access the internal components of AIO computers may become challenging.

BRIEF DESCRIPTION OF THE DRAWINGS

FIGS. 3-4 provide examples of apparatus that may be added to limit the travel of the panel of the AIO computing device.

DETAILED DESCRIPTION

Examples disclosed herein provide a form factor for an AIO computer including a mechanism that allows for internal access for service procedures and upgrades. As an example, the placement of the mechanism within the AIO computer may reduce any external design impact, maintaining the overall appearance of the computer. As consumers may consider the aesthetics of a product when selecting a product, it is preferable to keep the external appearance of the AIO computer desirable and, at the same time, allow for ease of internal access.

In one example, a computing device includes an enclosure and a support member rotatably connected to the enclosure at a first end of the support member, via a shaft disposed within the enclosure along a perimeter of the enclosure. The computing device includes a panel connected at a second end of the support member opposite the first end. As an example, the panel is to enclose the enclosure when the support member is to rotate towards the enclosure. When the support member is to rotate via the shaft, the support member is to wrap around the perimeter of the enclosure.

Figure 1A:
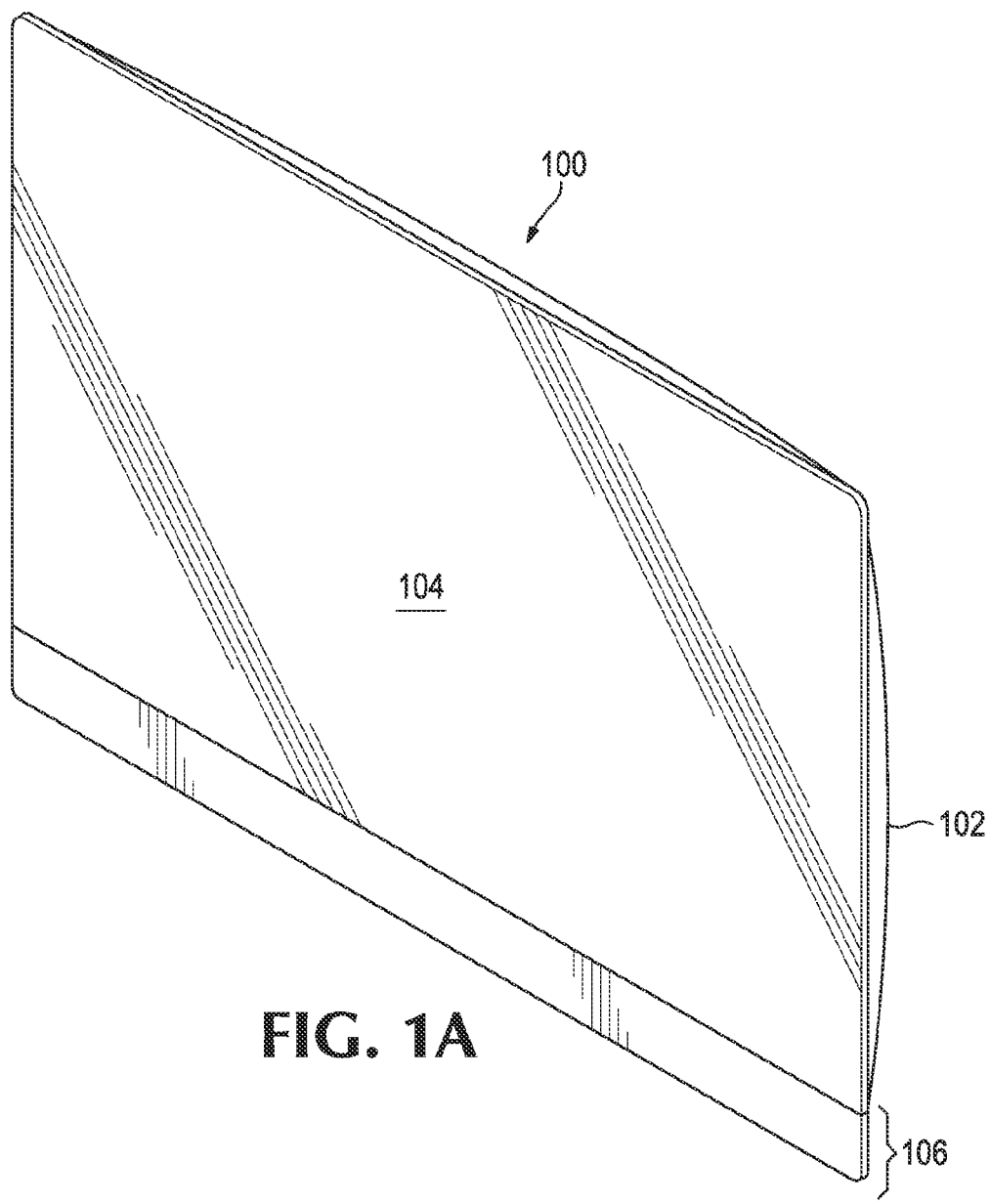
FIG. 1A illustrates an AIO computing device, according to an example.

With reference to the figures, FIG. 1A illustrates an AIO computing device 100, according to an example. The computing device 100 includes an enclosure 102 in order to house the internal components of the AIO device 100 (e.g., hard drive, graphics card, and memory). As illustrated, the enclosure 102 may be enclosed by a panel 104. As an example, the panel 104 may include a display surface used for viewing video output of the device 100, and include input means for operation by a user, such as a touchscreen.

Figure 1B:
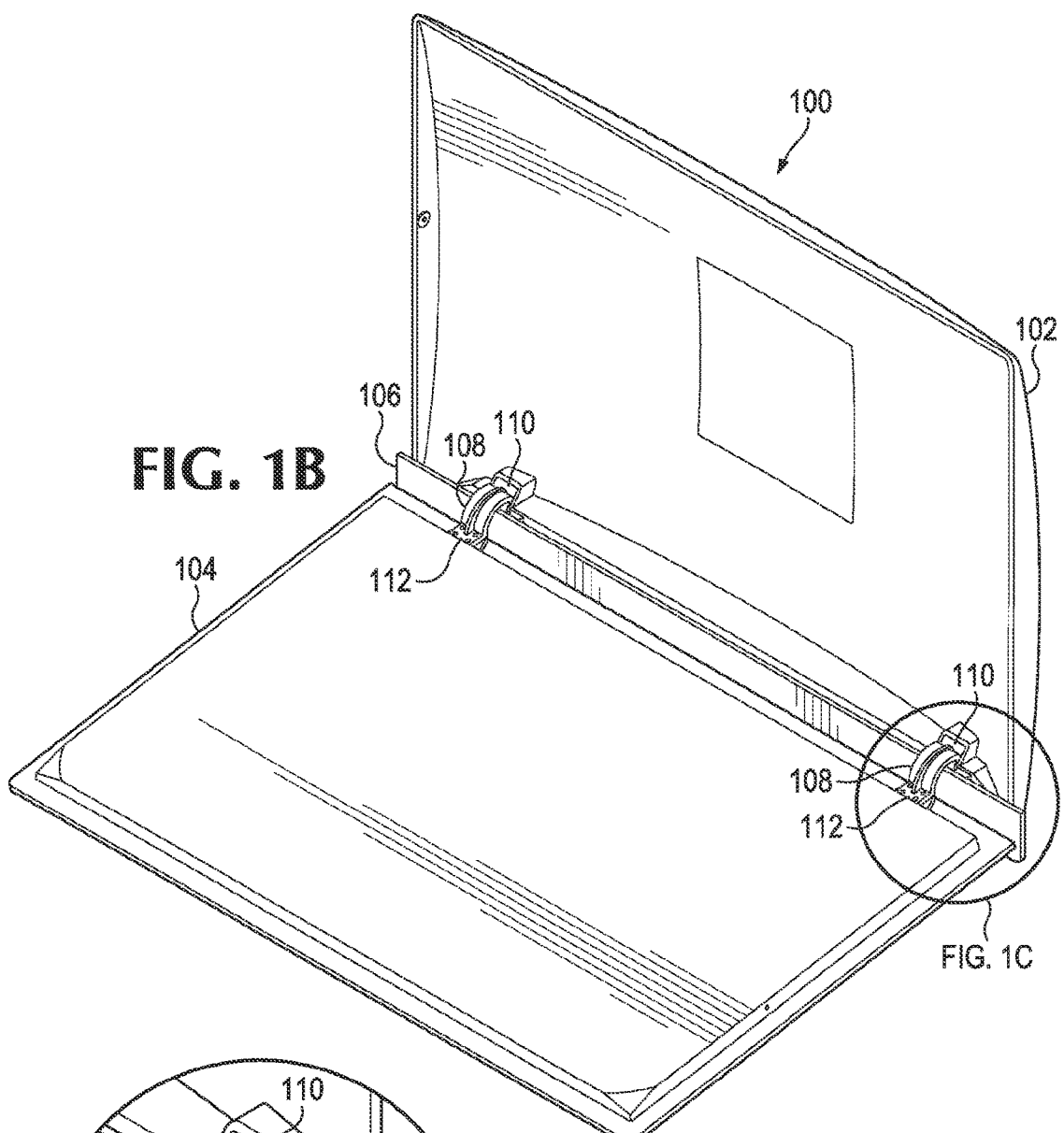
FIGS. 1B-C illustrate the opening of the AIO computing device for internal access, according to an example.
Figure 1C:
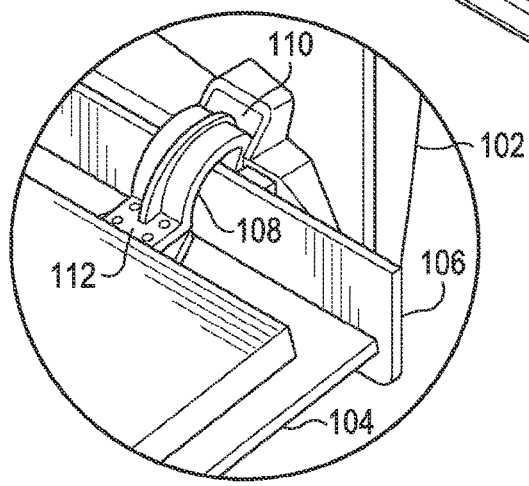

FIG. 1B illustrates the opening of the AIO computing device 100 for internal access, according to an example. The device 100 may include support members 108 (e.g., hinges) for rotating the panel 104 with respect to the enclosure 102 (further illustrated in FIG. 1C). As will be further described, with the ability to stow away the support members 108 within the enclosure 102, any external design impact to the device 100 may be reduced or eliminated. For example, referring back to FIG. 1A, where the AIO computing device 100 is closed, the support members 108 are hidden from view. This is advantageous for maintaining the external appearance of the device 100.

Although FIG. 1B illustrates the panel 104 supported by two support members 108, any number of support members may be used. For example, a single support member may be used to open and close the device 100. In addition, although FIG. 1B illustrates the placement of the support members 108 for opening of the device 100 along the bottom of the device 100, the support members 108 may be placed in other areas of the device 100. For example, the support members 108 may be placed along the top of the device 100, for opening the device along the top of the device 100 (not illustrated).

Figure 2A:
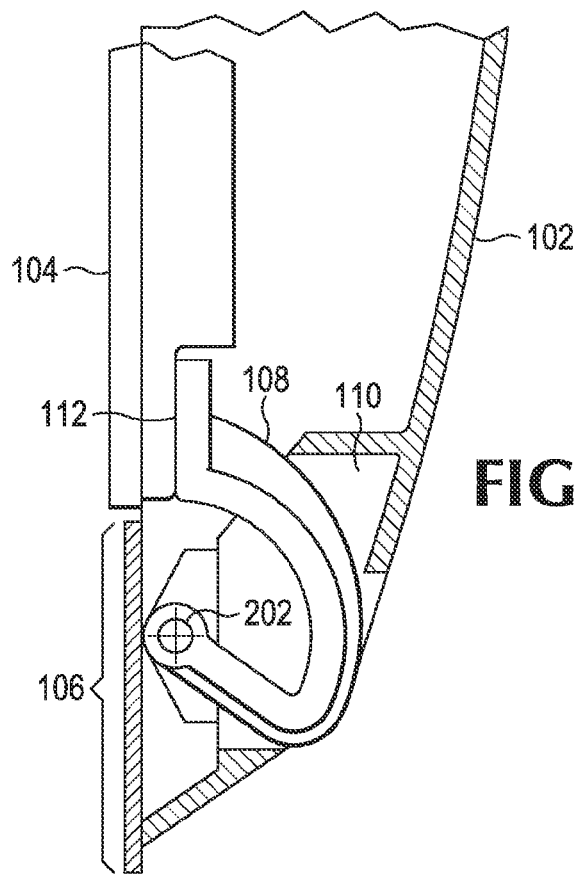
FIGS. 2A-B illustrate the opening and closing of the AIO computing device, according to an example.
Figure 2B:
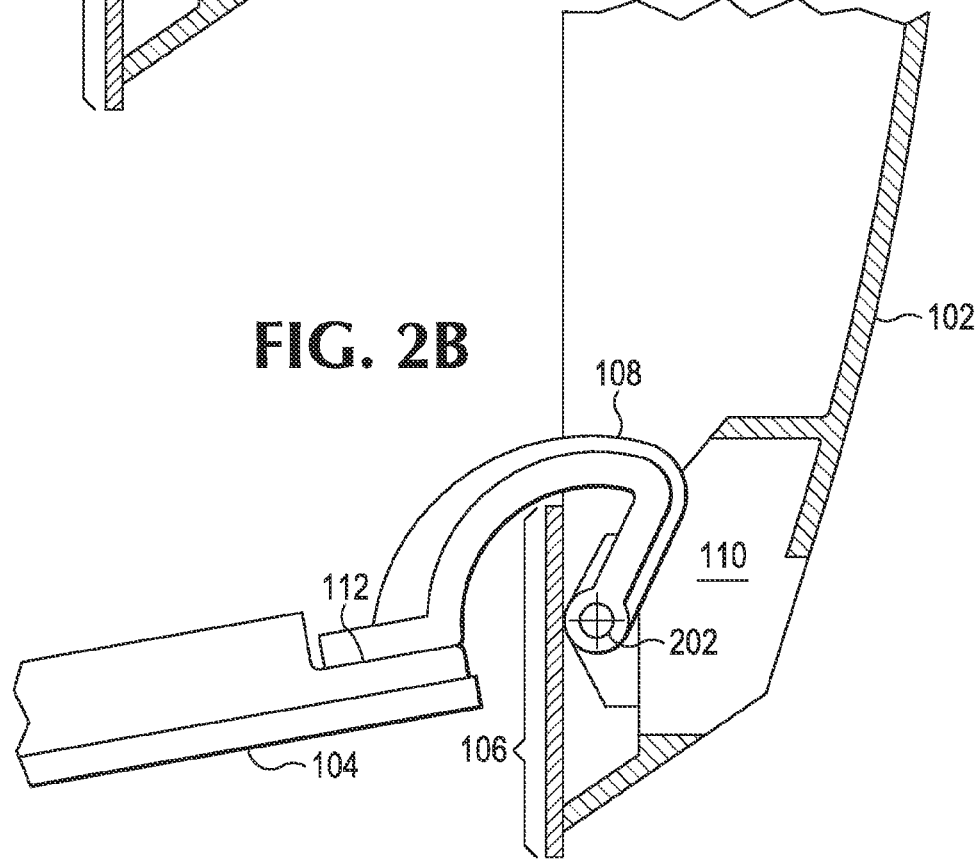

FIGS. 2A-B illustrate the opening and closing of the AIO computing device 100, and how the support members 108 stow away within an area 110 of the enclosure 102, according to an example. Each support member 108 may be rotatably or pivotally connected to the enclosure 102 at a first end of the support member 108, via a shaft 202 disposed within the enclosure 102 along a perimeter 106 of the enclosure 102. The panel 104 may be connected at a second end of the support member 108 (at 112) opposite the first end. As illustrated in the figures, the perimeter 106 may be a bottom perimeter of the enclosure. However, as previously mentioned, the placement of the support member is not limited to just the bottom perimeter. For example, the support member 108 may be rotatably connected to the enclosure 102 via a shaft disposed within the enclosure 102 along a top perimeter of the enclosure 102 (not illustrated).

Referring to FIG. 2A, where the panel 104 encloses the enclosure 102, the support member 108 stows away within an area 110 of the enclosure 102, along the bottom perimeter 106 of the enclosure 102. By having the shaft 202 disposed within the enclosure 102 along the bottom perimeter 106, the area 110 is able to accommodate the support member 108. As illustrated, the support member 108 may be curved to wrap around the perimeter 106 of the enclosure. For example, referring to FIG. 2B, the curvature of the support member 108 may allow for the support member 108 to wrap around the perimeter 106 of the enclosure 102. Similarly, when the support member 108 is to rotate towards the enclosure 102 (e.g., see FIG. 2A), the support member 108 is to rotate via the shaft 202 and also wrap around the perimeter 106 of the enclosure 102. As an example, the support members 108 may be hinges with curved arms that are designed to allow the hinge to be hidden within the enclosure 102.

With the capability to open and close the AIO computing device 100, it may be desirable to control the motion and travel of the support members 108 while rotating the panel 104 with respect to the enclosure 102. For example, it may not be desirable for the panel to quickly open or close, which may cause damage to the device 100. As an example, in order to control the speed of opening and closing the AIO computing device 100, clutches may be included at the pivot access of the support members 108, along shaft 202. The clutches (not illustrated) may provide friction for resisting a torque provided by a user. As an example, a pivot point of the support members 108 around the shaft 202 may have a frictional value to limit a speed of the rotation of the support members 108.

In addition to controlling the speed of opening and closing the AIO computing device 100, it may be desirable to limit how far the panel 104 opens up. For example, referring back to FIG. 2B, it may not be desirable to open panel 104 past the point illustrated, as opening past this point may cause the support member 108 to hit the bottom perimeter 106 and cause undue pressure at that location. FIGS. 3-4 provide examples of apparatus that may be added to limit the travel of the panel 104.

Referring to FIG. 3, an extendible strut 302 may be added to limit a motion of the panel 104 while opening the AIO computing device 100, according to an example. The strut 302 may restrict further opening of the panel 104 beyond a certain point. Referring to FIG. 3, the strut 302 may restrict further opening of the panel 104 past the point illustrated. As an example, the strut 302 may be gas-charged in order limit a speed of the rotation of the panel 104 and the support members 108. The gas-charged strut 302 may be used in combination or independently from clutches included at the pivot access of the support members 108 (described above) in order to control the speed of opening and closing the device 100. As an example, the extendible strut 302 may include a locking mechanism 304 that, once depressed, may initiate closing of the panel 104 to enclose the enclosure 104. At that point, the strut 302 may retract as the panel 104 is closed. Although one extendible strut 302 is illustrated in the figure, any number of struts may be used.

Referring to FIG. 4, a cable 402 may be added to limit a motion of the panel 104 while opening the AIO computing device 100, according to an example. The cable 402 may restrict further opening of the panel 104 beyond a certain point. Referring to FIG. 4, once the cable 402 fully extends, as illustrated, the cable 402 may restrict further opening of the panel 104. When the panel 104 is closed, the cable 402 may fold and remain within the enclosure 102. Although one cable 402 is illustrated in the figure, any number of cables may be used.

It should be understood that examples described herein below may include various components and features. It should also be understood that, in the following description, numerous specific details are set forth to provide a thorough understanding of the examples. However, it should be understood that the examples may be practiced without limitations to these specific details. In some instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It should be understood that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A computing device comprising:
    an enclosure having an area behind a perimeter, electronic components of the computing device disposed inside the enclosure;
    a support member rotatably connected to the enclosure at a first end of the support member, via a shaft disposed within the enclosure along the perimeter of the enclosure; and
    a panel connected at a second end of the support member opposite the first end, the panel comprising a display surface of the computing device;
    wherein the panel is fixedly connected to the second end of the support member,
    wherein the panel is to enclose the enclosure when the support member is rotated towards the enclosure, and
    wherein, when the support member is to rotate via the shaft, the support member is to wrap around the perimeter of the enclosure when the panel is opened away from the enclosure and is stowed away within the area behind the perimeter when the panel is closed over the enclosure.

2. The computing device of claim 1, wherein, when the panel is opened away from the enclosure, a portion of the support member abuts an edge of the perimeter of the enclosure.

3. The computing device of claim 1, comprising:
    an extendable strut to limit a motion of the panel wherein, when the support member is to rotate away from the enclosure, the extendable strut is to restrict further opening of the panel beyond a certain point.

4. The computing device of claim 3, wherein the extendable strut is gas-charged to limit a speed of the rotation of the support member.

5. The computing device of claim 3, wherein the extendable strut comprises a locking mechanism to initiate closing of the panel to enclose the enclosure.

6. The computing device of claim 1, comprising:
    cables to limit a motion of the panel wherein, when the support member is to rotate away from the enclosure, the cables are to restrict further opening of the panel beyond a certain point.

7. The computing device of claim 1, wherein a pivot point of the support member around the shaft has a frictional value to limit a speed of the rotation of the support member.

8. The computing device of claim 1, wherein, when the panel is closed over the enclosure, an elbow of the support member, located between the shaft and a point at which the support member is attached to the panel extends below the portion of the support member surrounding the shaft.

9. The computing device of claim 1, wherein, when the panel is fully open away from the enclosure, the panel is supported by the support member at a downward angle with a distal edge of the panel away from the enclosure being lower than a proximal edge of the panel attached to the support member.

10. The computing device of claim 1, wherein the shift has a frictional value with respect to the support member, wherein the frictional value resists torque provided by a user in opening the panel.

11. A computing device comprising:
an enclosure having an area behind a perimeter, with electronic components of the computing device disposed in the area of the enclosure;
a support member rotatably connected to the enclosure at a first end of the support member, via a shaft disposed within the enclosure along the perimeter of the enclosure; and
a panel fixedly connected at a second end of the support member opposite the first end, the panel comprising a display surface of the computing device,
wherein the panel is to enclose the enclosure when the support member is to rotate towards the enclosure, and
wherein, when the support member is to rotate via the shaft, the support member is curved to wrap around the perimeter of the enclosure when the panel is opened away from the enclosure, and
when the panel is fully open away from the enclosure, the panel is supported by the support member at a downward angle with a distal edge of the panel away from the enclosure being lower than a proximal edge of the panel attached to the support member.

12. The computing device of claim 11, wherein, when the panel is to enclose the enclosure, the support member is to stow away within the enclosure along the perimeter of the enclosure.

13. The computing device of claim 11, wherein a pivot point of the support member around the shaft has a frictional value to limit a speed of the rotation of the support member.

14. The computing device of claim 11, comprising:
an extendable strut to limit a motion of the panel wherein, when the support member is to rotate away from the enclosure, the extendable strut is to restrict further opening of the panel beyond a certain point.

15. The computing device of claim 11, comprising:
cables to limit a motion of the panel wherein, when the support member is to rotate away from the enclosure, the cables are to restrict further opening of the panel beyond a certain point.

16. The computing device of claim 11, wherein, when the panel is opened away from the enclosure, a portion of the support member abuts an edge of the enclosure.

17. The computing device of claim 11, wherein the frictional value resists torque provided by a user in opening the panel.

18. A computing device comprising: an enclosure having an area behind a perimeter, with electronic components of the computing device disposed inside the enclosure; a support member rotatably connected to the enclosure at a first end of the support member, via a shaft disposed within the enclosure along the perimeter of the enclosure, wherein a pivot point of the support member around the shaft has a frictional value to limit a speed of the rotation of the support member; and a panel fixedly connected at a second end of the support member opposite the first end, the panel comprising a display surface of the computing device, wherein, when the panel is opened away from the enclosure, the support member is to wrap around the perimeter of the enclosure and, when the panel is to be closed over the enclosure, the support member is stowed away within the area behind the perimeter.

19. The computing device of claim 18, comprising:
an extendable strut to limit a motion of the panel wherein, when the support member is to rotate away from the enclosure, the extendable strut is to restrict further opening of the panel beyond a certain point.

20. The computing device of claim 18, comprising:
cables to limit a motion of the panel wherein, when the support member is to rotate away from the enclosure, the cables are to restrict further opening of the panel beyond a certain point.

* * * * *